May 26, 1953 R. J. OLANDER 2,639,628
CLUTCH SHIFTING MECHANISM FOR GEARED HAND BRAKES
Filed Feb. 15, 1951 3 Sheets-Sheet 2

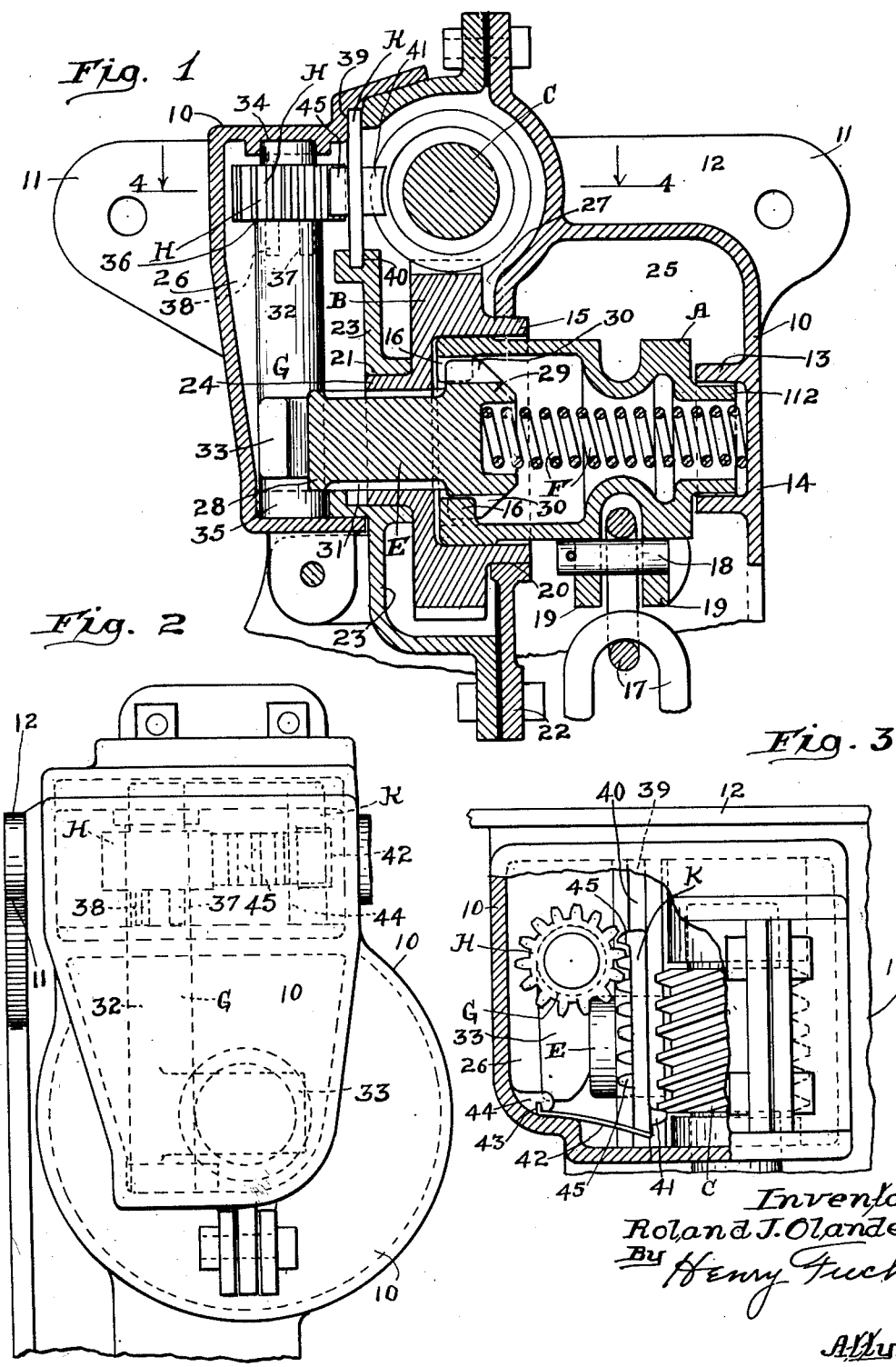

Inventor:
Roland J. Olander.
By Henry Fuchs
Attys.

May 26, 1953 R. J. OLANDER 2,639,628
CLUTCH SHIFTING MECHANISM FOR GEARED HAND BRAKES
Filed Feb. 15, 1951 3 Sheets-Sheet 3
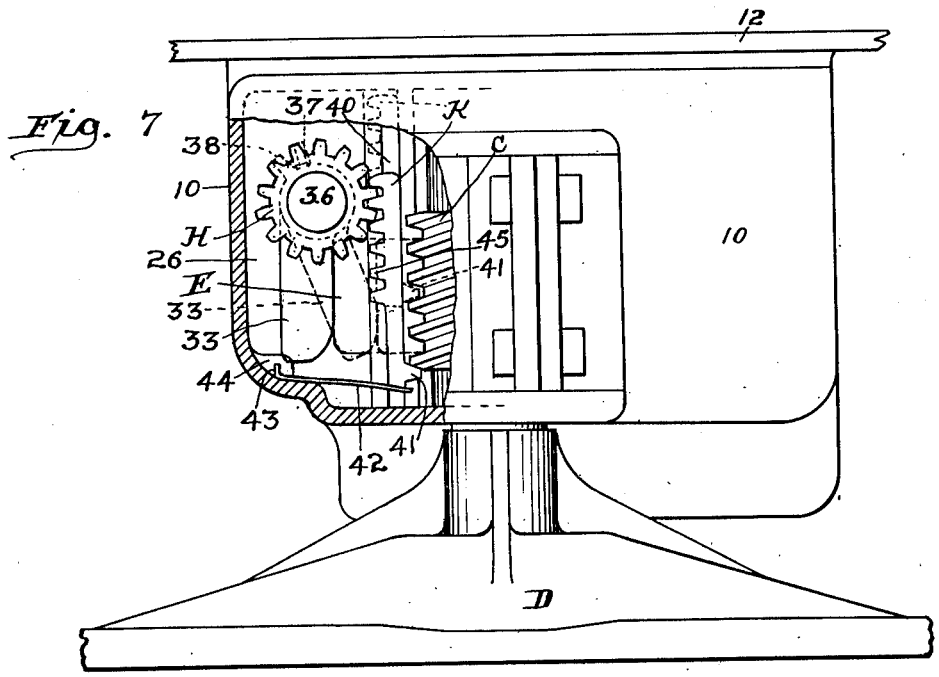
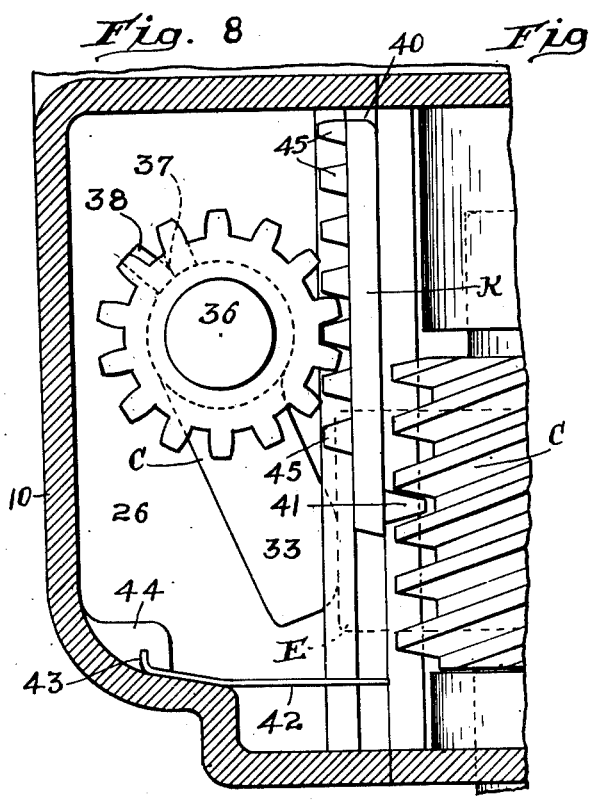
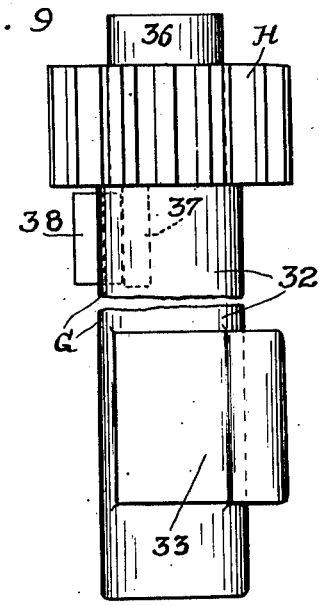
Inventor:
Roland J. Olander.
By Henry Fuchs
Atty.

Patented May 26, 1953

2,639,628

UNITED STATES PATENT OFFICE 2,639,628

CLUTCH SHIFTING MECHANISM FOR GEARED HAND BRAKES

Roland J. Olander, Chicago, Ill., assignor to W. H. Miner, Inc., Chicago, Ill., a corporation of Delaware Application February 15, 1951, Serial No. 211,059

6 Claims. (Cl. 74—505)

This invention relates to improvements in clutch shifting means for worm gear actuated hand brakes of railway cars.

One object of the invention is to provide in a hand brake mechanism of the power multiplying type, comprising a worm element actuated by the usual hand wheel, a worm wheel meshing with the worm element, and a chain winding member, operatively connected to the worm wheel by a shiftable clutch member, a clutch shifting mechanism actuated by rotation of the worm element in brake tightening direction for effecting operative connection of the worm gear with the chain winding member, and actuated by rotation of the worm element in a reverse or brake releasing direction for shifting the clutch member to disconnect the worm and chain winding member, after backing off of the brakes to a predetermined extent, to permit free rotation of the chain winding member to effect complete release of the brakes.

A more specific object of the invention is to provide a mechanism as set forth in the preceding paragraph, wherein the clutch shifting mechanism comprises a reciprocating slide having its movements controlled by rotation of the worm element, and provided with rack teeth, a rotatable pinion meshing with the rack teeth of the slide, a rotary member coaxial with the pinion, a lost motion connection between the pinion and rotary member, and a radial arm on the rotary member operatively engaged with the clutch member to actuate the same.

Figure 5:
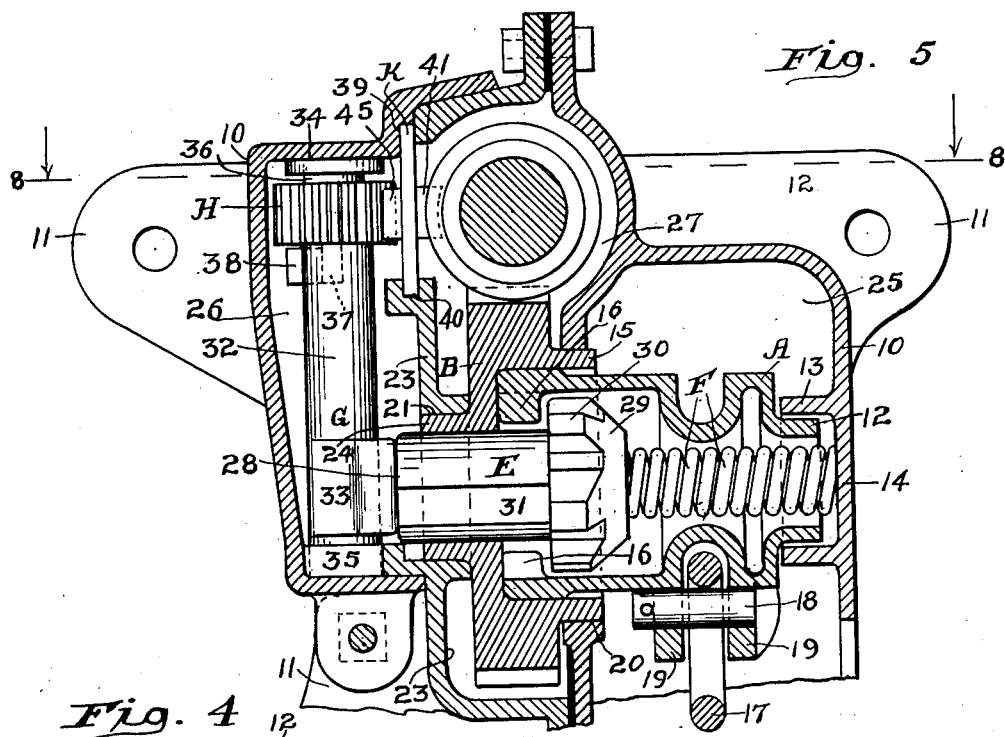
Figure 4:
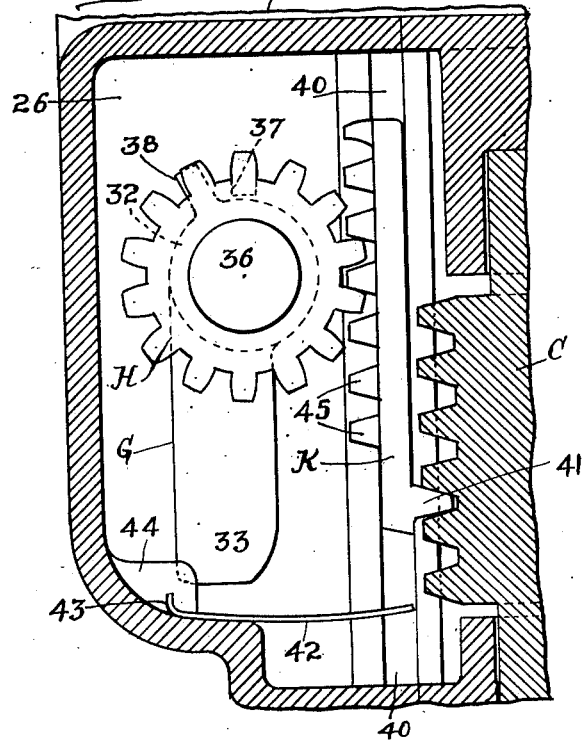
Figure 6:
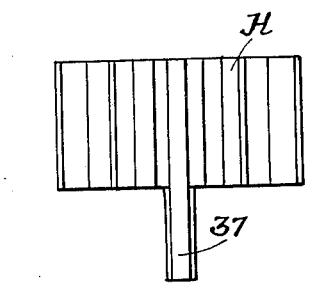

Other objects of the invention will more clearly appear from the description and claims hereinafter following:

In the accompanying drawings forming a part of this specification, Figure 1 is a vertical sectional view, partly broken away, of a hand brake mechanism, illustrating my improvements in connection therewith, the mechanism being shown in the position occupied when mounted on the vertical end wall of a railway car, and the section being in a plane parallel to said wall. Figure 2 is a side elevational view of Figure 1, looking from left to right in the last named figure. Figure 3 is a top plan view of Figure 1, with the top wall of the housing partly broken open to show the mechanism contained in the housing. Figure 4 is a horizontal sectional view, partly broken away, corresponding substantially to the line 4—4 of Figure 1, but showing the slide and pinion of the clutch shifting mechanism in top plan. Figure 5 is a view similar to Figure 1, showing the various parts of the mechanism in different positions. Figure 6 is a side elevational view of the pinion of the clutch shifting mechanism. Figure 7 is a view similar to Figure 3, illustrating in dotted lines the position assumed by the parts when the clutch member has been moved to the disengaged position, as shown in Figure 5. Figure 8 is a broken, horizontal sectional view, on an enlarged scale, through the housing, corresponding substantially to the line 8—8 of Figure 5, showing the worm element, slide, and pinion in plan. Figure 9 is a broken, side elevational view of the clutch shifting member and pinion, looking upwardly in Figure 8.

In said drawings, my improved brake mechanism is shown as enclosed in a housing 10, having securing ears or lugs 11—11 on the rear wall 12 thereof, adapted to accommodate fastening elements, such as bolts, for securing the housing to the vertical end wall of a railway car.

My improved hand brake mechanism comprises broadly a chain winding drum A, a worm wheel B, a worm element C, a hand wheel D, a sliding clutch member E, a clutch spring F, a clutch shifting member G, a pinion H having a lost motion connection with the clutch shifting member G, and a movable slide K meshing with the pinion H and having its movements controlled by the operation of the worm element C.

A chain winding drum A is hollow and has a reduced portion at its right hand end, as seen in Figure 1, forming a bearing projection 112, which is journaled in an interior bearing sleeve 13 on the right hand side wall 14 of the housing 10. The left hand end of the drum A is supported by the worm wheel B, the latter being provided with a hollow hub portion 15 at its right hand side into which the drum projects and within which the end of the drum is journaled for rotation. At the left hand end, the drum is provided with interior clutch projections or teeth 16.

The brake chain, a portion of which is shown in Figures 1 and 5, is indicated by 17 and is windable on the drum A in the usual manner, having the end link thereof fixed to the drum by a pin 18 extending through ears or lugs 19—19 on said drum.

The worm wheel B is supported at opposite sides in bearings 20 and 21 provided in vertical partition walls 22 and 23 of the housing 10, the hub portion 15 being journaled in the bearing 20. At the left hand side thereof, as seen in Figure 1, the worm wheel B has a cylindrical hub portion 24 of reduced diameter, journaled in the bearing 21 in the partition wall 23.

The partition walls 22 and 23 of the housing 10 divide the latter into a right hand chamber 25, a left hand chamber 26, and an intermediate chamber 27, as viewed in Figure 1.

The worm element C is disposed above the worm wheel B, within the chamber 27. The opposite ends of the worm element are journaled in bearings provided in the front and rear walls of the housing 10, and the hand wheel D is fixed to the outer end of said worm element, as clearly illustrated in Figure 7.

The sliding clutch member E comprises a cylindrical shank 28 having a head 29 at its inner end provided with a plurality of clutch teeth 30 engageable with the teeth 16 of the drum A. The shank member 28 of the clutch member E is slidable in the hub 24 of the worm wheel B and projects therefrom into the chamber 26. The clutch member E has a splined connection 31 with the worm wheel B to effect rotation of said clutch element therewith.

The clutch spring F is disposed within the hollow portion of the drum A and has its opposite ends bearing respectively on the clutch head 29 and the wall 14 of the housing 10. The spring F is under compression so that it normally holds the clutch member E in the engaged position shown in Figure 1.

The clutch shifting member G is arranged within the chamber 26 and comprises a vertically disposed shaft 32 having a radially projecting arm 33 near its lower end engageable with the outer end of the shank portion of the sliding clutch member E. The top and bottom ends of the shaft 32 are journaled in bearings 34 and 35 provided in the top and bottom walls of the chamber 26. The upper end of the shaft 32 is of reduced diameter to provide a bearing portion 36 for the pinion H. The pinion H is journaled on this bearing portion 36 of the shaft 32 and has a depending finger 37 thereon engageable with a radial lug 38 on the shaft 32 located immediately below the reduced bearing portion 36 of this shaft. The finger 37 of the pinion H and the lug 38 provide a lost motion driving connection between the pinion and shaft, permitting limited relative rotation of the pinion and shaft during the brake releasing operation and thereby allowing for backing off of the brakes to a predetermined extent before complete release of the same by throwing out of the clutch member E.

The slide K is arranged within the top portion of the housing 10 between the chambers 26 and 27 thereof, being in the form of an elongated heavy plate having its top and bottom end portions guided in lengthwise extending guide grooves 39 and 40 formed respectively in the top wall of the housing 10 and the partition wall 23 which separates the chambers 26 and 27.

On its inner side, the slide K has a laterally projecting tooth 41 adapted to mesh with the threads of the worm element C. The tooth 41 of the slide K is normally engaged with the outer end portion of the thread of the worm element, being yieldingly pressed against the same by a plate spring 42 bearing at one end on the outer end of the slide, and having its other end fixed in a slot 43 provided in a web 44 on the bottom and outer side walls of the chamber 26 of the housing 10. On the other or outer side thereof, the slide K is provided with rack teeth 45 meshing with the teeth of the pinion H.

The operation of my improved hand brake mechanism, in applying the brakes, is as follows: With the parts in the full line positions shown in Figures 1, 2, 3, and 7, the hand wheel D is rotated in clockwise or right hand direction, as viewed in Figure 7, thereby rotating the worm element C in clockwise direction, as viewed in Figures 1, 3, and 7. Rotary motion in chain winding direction is thus transmitted to the drum A by the worm wheel B with which the worm element C meshes, the clutch member E being at this time in operative clutching engagement with the drum. During this operation, the tooth 41 of the slide K idles over the thread of the worm element C, and the slide remains in a stationary position with the tooth thereof pressed against the thread of the worm element.

In releasing the brakes, the hand wheel D is rotated in contraclockwise direction, as viewed in Figure 1, thereby effecting rotation of the worm element C in a direction reverse to that while the brakes are being applied, that is, in contraclockwise direction. During this contraclockwise rotation of the worm element C, the tooth 41 of the slide K will be brought into mesh with the thread of the worm element and threaded rearwardly on said worm element to move the slide rearwardly from the position shown in Figure 3 and the full line position shown in Figure 7, through the position shown in Figure 4, to the dotted line position shown in Figure 7 and the full line position shown in Figure 8. Inasmuch as the rack teeth 45 of the slide K are in mesh with the teeth of the pinion H, rotation is imparted to the latter during this action, the rotation of the pinion H being in contraclockwise direction, as viewed in Figures 3, 4, 7, and 8. In the position shown in Figure 1 and in the full line position shown in Figure 7, the finger 37 is spaced an appreciable distance from the projecting lug 38 of the shaft of the shifting member G, that is, at the beginning of this brake releasing operation, and approaches and engages the lug 38 as the parts are rotated through the position shown in Figure 4 toward the position shown in dotted lines in Figure 7 and in full lines in Figure 8, thus swinging the arm 33 of the clutch shifting member G inwardly against the clutch member E and throwing the latter out of engagement to permit free rotation of the drum A and quick release of the brakes. As will be evident, movement of the slide K does not immediately effect disengagement of the clutch member E, there being lost motion between the pinion H and the shifting member G before driving relation is established therebetween by engagement of the finger 37 with the lug 38. This lost motion provides for a predetermined desired amount of backing off of the brakes before quick release is effected. When the brakes are again applied by rotation of the hand wheel D and worm element C in clockwise direction, threaded engagement of the worm element with the tooth 41 of the slide K, as shown in Figure 8, causes the slide to travel outwardly to the position shown in Figure 1, returning the arm 33 of the clutch shifting member to the position shown in Figure 1 and the full line position shown in Figure 7, thereby permitting the spring F to project the clutch member E outwardly to reengage the teeth thereof with the teeth of the worm wheel. Upon further rotation of the hand wheel and the attached worm element C in clockwise direction, the brake will be applied or tightened as hereinbefore described.

I claim:

1. In a hand brake mechanism, the combination with a rotary chain winding member; of a rotary driving member; a reciprocating clutch member operatively connecting said rotary winding member and driving member; a manually actuated worm element operatively meshing with the driving member for rotating the same in reverse directions; a rotary clutch shifting member having an arm thereon engageable with the clutch member for shifting the latter; a reciprocating slide having a tooth engageable with the worm element to be actuated thereby; a rotary pinion coaxial with said clutch shifting member; driving connections between the pinion and the clutch shifting member; and a rack on said slide meshing with said pinion.

2. In a hand brake mechanism, the combination with a rotary chain winding member; of a rotary driving member; a reciprocating clutch member operatively connecting said rotary winding member and driving member; a manually actuated worm element operatively meshing with the driving member for rotating the same in reverse directions; a rotary clutch shifting member having an arm thereon engageable with the clutch member for shifting the latter; a reciprocating slide having a tooth engageable with the worm element to be actuated thereby; a rotary pinion coaxial with said clutch shifting member; driving connections between the pinion and the clutch shifting member; a spring acting on said slide to yieldingly press the tooth thereof against the thread of said worm element; and a rack on said slide meshing with said pinion.

3. In a hand brake mechanism, the combination with a rotary chain winding member; of a rotary driving member; a reciprocating clutch member operatively connecting said rotary winding member and driving member; a manually actuated worm element operatively meshing with the driving member for rotating the same in reverse directions; a rotary clutch shifting member including a shaft having a radial arm thereon engageable with the clutch member for shifting the latter; a reciprocating slide having a tooth engageable with the worm element to be actuated thereby; a pinion rotatably mounted on said shaft of said clutch shifting member; lost motion driving connections between the pinion and the shaft of said clutch shifting member; and a rack on said slide meshing with said pinion.

4. In a hand brake mechanism, the combination with a rotary chain winding member; of a rotary driving member; a reciprocating clutch member operatively connecting said rotary winding member and driving member; a manually actuated worm element operatively meshing with the driving member for rotating the same in reverse directions; a rotary clutch shifting member having an arm thereon engageable with the clutch member for shifting the latter; a reciprocating slide having a tooth engageable with the worm element to be actuated thereby; a rotary pinion coaxial with said clutch shifting member; lost motion driving connections between the pinion and the clutch shifting member; spring means bearing on said slide for pressing said slide rearwardly with the tooth thereof bearing on the outer end of the thread of said worm element; and a rack on said slide meshing with said pinion.

5. In a hand brake mechanism, the combination with a rotary chain winding member; of a rotary driving member; a reciprocating clutch member operatively connecting said rotary winding member and driving member; a manually actuated worm element operatively meshing with the driving member for rotating the same in reverse directions; a rotary shaft having a radial arm thereon engageable with the clutch member for shifting the latter; a reciprocating slide having a tooth engageable with the worm element to be actuated thereby; a rotary pinion coaxial with said shaft of said clutch shifting member; a finger on said pinion; a radial lug on said rotary clutch shifting member in the path of movement of said finger and engageable thereby to transmit rotary motion from said pinion to said clutch shifting member; and a rack on said slide meshing with said pinion.

6. In a hand brake mechanism, the combination with a rotary chain winding member; of a rotary driving member; a reciprocating clutch member operatively connecting said rotary winding member and driving member; a manually actuated worm element operatively meshing with the driving member for rotating the same in reverse directions; a rotary clutch shifting member having an arm thereon engageable with the clutch member for shifting the latter; a reciprocating slide having a tooth engageable with the worm element to be actuated thereby; a rotary pinion coaxial with said clutch shifting member; a lost motion driving connection between said pinion and clutch shifting member, comprising a finger on said pinion and a radial lug on said shifting member in the path of movement of said finger and circumferentially spaced therefrom when said slide is positioned with the tooth thereof bearing on the outer end of the thread of the worm element; and a rack on said slide meshing with said pinion.

ROLAND J. OLANDER.

References Cited in the file of this patent

UNITED STATES PATENTS

| Number | Name | Date |
|---|---|---|
| 1,928,027 | Olander | Sept. 26, 1933 |
| 2,049,715 | Olander | Aug. 4, 1936 |
| 2,485,026 | Williams | Oct. 18, 1949 |